US011639667B2

(12) United States Patent
Kato et al.

(10) Patent No.: US 11,639,667 B2
(45) Date of Patent: May 2, 2023

(54) ROTOR SUPPORT DEVICE, ROTOR, GAS TURBINE ENGINE, AND AIRCRAFT

(71) Applicant: SUBARU CORPORATION, Tokyo (JP)

(72) Inventors: Hiroki Kato, Tokyo (JP); Maki Kikuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1204 days.

(21) Appl. No.: 16/192,718

(22) Filed: Nov. 15, 2018

(65) Prior Publication Data

US 2019/0193842 A1    Jun. 27, 2019

(30) Foreign Application Priority Data

Dec. 26, 2017    (JP) .............................. JP2017-249542

(51) Int. Cl.
*F01D 11/10*    (2006.01)
*B64C 23/00*    (2006.01)
(Continued)

(52) U.S. Cl.
CPC ............ *F01D 11/10* (2013.01); *B64C 23/005* (2013.01); *F01D 11/20* (2013.01); *F15D 1/0075* (2013.01);
(Continued)

(58) Field of Classification Search
CPC .......... F01D 11/10; F01D 11/20; F01D 5/145; B64C 23/005; B64C 11/001; B64C 27/82;
(Continued)

(56) References Cited

U.S. PATENT DOCUMENTS

| 6,710,739 B1 * | 3/2004 | Loegering ............... G01S 19/21 |
| | | 455/296 |
| 2008/0145210 A1 * | 6/2008 | Lee ....................... F04D 29/681 |
| | | 415/176 |

(Continued)

FOREIGN PATENT DOCUMENTS

| JP | 2006-513084 A | 4/2006 |
| JP | 2008-95692 A | 4/2008 |

(Continued)

OTHER PUBLICATIONS

Segawa, Takehiko et al. "Industrial Application of Plasma Actuator", Journal of Plasma and Fusion Research vol. 91, No. 10 (2015), pp. 665-670.

*Primary Examiner* — Mickey H France
(74) *Attorney, Agent, or Firm* — Troutman Pepper Hamilton Sanders LLP

(57) ABSTRACT

A rotor support device includes a plurality of first electrodes, a plurality of second electrodes, a dielectric material, and at least one alternating-current power supply. The dielectric material is disposed between the plurality of first electrodes and the plurality of second electrodes. The at least one AC power supply is configured to apply an alternating-current voltage across the plurality of first electrodes and the plurality of second electrodes and induce flows of gas by causing dielectric barrier discharge between the plurality of first electrodes and the plurality of second electrodes. At least one of the plurality of first electrodes or the plurality of second electrodes is disposed apart from each other in a static system that is stationary with respect to a rotor provided in an aircraft. The static system is adjacent to the rotor.

16 Claims, 8 Drawing Sheets

(51) Int. Cl.
  *F01D 11/20*    (2006.01)
  *F15D 1/00*     (2006.01)
  B64C 11/00      (2006.01)
  B64C 27/82      (2006.01)
  B64C 29/00      (2006.01)

(52) U.S. Cl.
  CPC ............ *B64C 11/001* (2013.01); *B64C 27/82* (2013.01); *B64C 29/0025* (2013.01); *B64C 2027/8254* (2013.01); *B64C 2230/12* (2013.01); *F05D 2220/328* (2013.01); *F05D 2220/329* (2013.01); *F05D 2270/172* (2013.01); *Y02T 50/60* (2013.01)

(58) Field of Classification Search
  CPC ........ B64C 29/0025; B64C 2027/8254; B64C 2230/12; B64C 21/00; F15D 1/0075; F05D 2220/328; F05D 2220/329; F05D 2270/172; F05D 2270/17; Y02T 50/60; Y02T 50/10; H05H 1/24; H05H 1/2406; H05H 1/2439

USPC .................................. 415/173.1; 315/111.21
  See application file for complete search history.

(56) References Cited

U.S. PATENT DOCUMENTS

2010/0284795 A1* 11/2010 Wadia .................. F04D 29/687
                                                  415/173.1
2011/0236182 A1*  9/2011 Wiebe ..................... F01D 11/20
                                                  415/173.1
2015/0307190 A1* 10/2015 Probst ................ B32B 38/0012
                                                     156/92

FOREIGN PATENT DOCUMENTS

| | | |
|---|---|---|
| JP | 2008-163940 A | 7/2008 |
| JP | 2011-508148 A | 3/2011 |
| JP | 2011-508847 A | 3/2011 |
| JP | 2012-207667 A | 10/2012 |
| WO | WO-2005114013 A1 * | 12/2005 ............. F01D 11/10 |

* cited by examiner

ROTOR SUPPORT DEVICE, ROTOR, GAS TURBINE ENGINE, AND AIRCRAFT

CROSS-REFERENCE TO RELATED APPLICATIONS

The present application claims priority from Japanese Patent Application No. 2017-249542 filed on Dec. 26, 2017, the entire contents of which are hereby incorporated by reference.

BACKGROUND

Technical Field

Examples of the present invention relate to a rotor support device, a rotor, a gas turbine engine, and an aircraft.

A gas turbine engine has been known as one of engines for aircraft. In a gas turbine engine, a turbine is rotated by high temperature gas generated by burning fuel. It should be noted here that a gas turbine is used not only for an engine, but also for an electric power generation apparatus and the like.

Formation of a good gas flow is important to improve the energy efficiency of a gas turbine. For instance, the energy efficiency of a gas turbine may be improved by reducing flows of gas leaking from the clearance between the tips of moving blades (rotor blades) and the casing. Therefore, various techniques for adjusting flows of gas by attaching plasma actuators (PA) to a gas turbine have been proposed (see, for instance, Japanese Unexamined Patent Application Publication (JP-A) No. 2008-95692, Japanese Unexamined Patent Application Publication (Translation of PCT Application) (JP-T) No. 2011-508148, JP-T No. 2011-508847, JP-A No. 2012-207667, JP-A No. 2008-163940, and Takehiko Segawa and other four authors, "Industrial Application of Plasma Actuator", Journal of Plasma and Fusion Research Vol. 91, No. 10 (2015), pp. 665-670, searched on Aug. 30, 2017, see Internet URL http://www.jspf.or.jp/Journal/PDF_JSPF/jspf2015_10/jspf2015_10-665.pdf).

SUMMARY OF THE INVENTION

According to an aspect of the present invention, a rotor support device includes a plurality of first electrodes, a plurality of second electrodes, a dielectric material, and at least one AC power supply. The dielectric material is disposed between the plurality of first electrodes and the plurality of second electrodes. The at least one AC power supply is configured to apply an alternating-current voltage across the plurality of first electrodes and the plurality of second electrodes and induce flows of gas by causing dielectric barrier discharge between the plurality of first electrodes and the plurality of second electrodes, in which at least one of the plurality of first electrodes or the plurality of second electrodes is disposed apart from each other in a static system that is stationary with respect to a rotor provided in an aircraft, the static system being adjacent to the rotor.

In addition, a rotor may include the support device.

In addition, a gas turbine engine may include the support device and the rotor.

In addition, an aircraft may include the gas turbine engine.

In addition, an aircraft may include the rotor.

DETAILED DESCRIPTION

In the following, some preferred examples of the technology are described in detail with reference to the accompanying drawings. Note that the following description is directed to illustrative examples of the disclosure and not to be construed as limiting to the technology. Factors including, without limitation, numerical values, dimensions, shapes, materials, components, positions of the components, and how the components are coupled to each other are for purposes of illustration to give an easier understanding of the technology, and are not to be construed as limiting to the technology, unless otherwise specified. Further, elements in the following examples which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the technology is omitted.

A practical PA used to control flows of gas in a gas turbine is a DBD-PA that forms flows of gas using dielectric barrier discharge (DBD). A DBD-PA is a PA that has electrodes and a dielectric material sandwiched therebetween and generates plasma only on one side of the dielectric material by applying a high alternating-current (AC) voltage between the electrodes. A DBD-PA may be used to adjust flows of gas by controlling plasma. Therefore, techniques for adjusting flows of gas by attaching a DBD-PA to a gas turbine have been proposed.

It is desirable to improve the performance of an apparatus having rotors, such as a gas turbine engine, provided in an aircraft using a simple structure.

First Example (Structure and Function)

Figure 1:
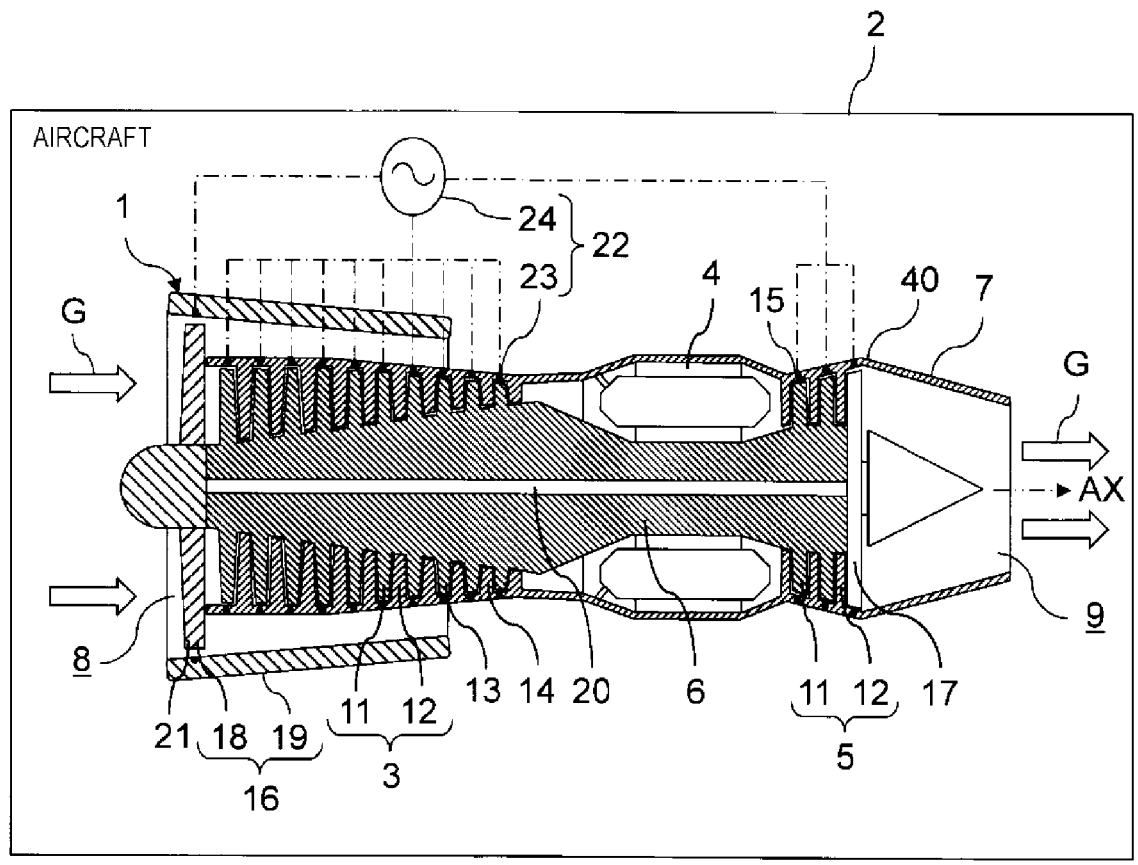
FIG. 1 is a structural diagram illustrating a gas turbine engine having a rotor support device according to an example of the present invention.

FIG. 1 is a structural diagram illustrating a gas turbine engine having a rotor support device according to an example of the present invention.

A gas turbine engine 1 is provided in an aircraft 2 such as a fixed-wing aircraft or a rotary-wing aircraft as a propulsion mechanism configured to achieve a thrust force. The typical gas turbine engine 1 has a structure in which a compressor 3, a combustion chamber 4, and a turbine 5 are disposed along a rotary shaft 6 and these components are protected by a cylindrical casing 7. An intake port 8 for gas G is formed at one opening end of the casing 7, which is close to the inlet of the compressor 3, and an exhaust port 9 is formed at the other opening end of the casing 7, which is close to the outlet of the turbine 5.

The air (gas G) captured through the intake port 8 is pressurized by the compressor 3. The pressurized air pressurized by the compressor 3 is ignited in the state in which the pressurized air is mixed with fuel in the combustion chamber 4. This burns the fuel and air and generates high temperature and high pressure combustion gas. The high temperature and high pressure combustion gas generated in the combustion chamber 4 is fed to the turbine 5.

When the gas turbine engine 1 is a jet engine for a fixed-wing aircraft, part of the energy of combustion gas energy is used to rotate the turbine 5 and part of the remaining energy is used as a jet propulsion force of the gas turbine engine 1, as illustrated in FIG. 1. That is, the gas G discharged from the exhaust port 9 becomes a jet. On the other hand, when the gas turbine engine 1 is an engine for a rotary-wing aircraft such as a helicopter, the energy of combustion gas is used to rotate the turbine 5 coupled to the output shaft of and exhaust gas is discharged as the gas G from the exhaust port 9.

In the typical compressor 3 and the typical turbine 5, moving blades (rotors) 11 and stationary blades (stators) 12 are adjacent to each other. In the moving blade 11, a plurality of rotor blades 13 is fixed to the rotary shaft 6 so that the rotor blades 13 are arranged radially in the longitudinal direction thereof. On the other hand, in the stationary blade 12, a plurality of stator vanes 14 is fixed to the casing 7 so that the stator vanes 14 are arranged radially in the longitudinal direction thereof. The moving blade 11 and the stationary blade 12 are protected by an annular casing 15 which is formed as a part of the cylindrical casing 7. The plurality of moving blades 11 and the plurality of stationary blades 12 are disposed alternately in the longitudinal direction of the rotary shaft 6 in the typical compressor 3 and the typical turbine 5. Alternatively, the stationary blade 12 may not be disposed partially.

In addition, when the gas turbine engine 1 is a turbofan engine, an intake fan 16 is provided near the intake port 8 and another turbine 17 for rotating the intake fan 16 is provided at a rear stage of the turbine 5 for obtaining a thrust force, as illustrated in FIG. 1. It should be noted here that the intake fan 16 may be classified into a part of a compressor on the low pressure side.

In the intake fan 16, a moving blade (rotor) 18 is protected using an annular casing 19. In the moving blade 18 of the intake fan 16, a plurality of rotor blades 21 is fixed to a rotary shaft 20 of the turbine 17 for the intake fan 16 so that the rotor blades 21 are arranged radially in the longitudinal direction thereof. In addition, the plurality of moving blades 18 may be provided in the longitudinal direction of the rotary shaft 20 as the intake fan 16 or a compressor on the low pressure side. Also, the stationary blades may be adjacent to the moving blades 18.

A support device 22 is provided in the moving blades 11 of at least one of the compressor 3 or the turbine 5 provided in the gas turbine engine 1 described above. Since the gas turbine engine 1 is normally provided with the plurality of moving blades 11, the support device 22 may be provided in each of the moving blades 11. The support device 22 supports the moving blade 11 by inducing a flow of the gas G.

When the moving blade 11 of the compressor 3 is supported, a flow of air is induced by the support devices 22. On the other hand, when the moving blade 11 of the turbine 5 is supported, a flow of high temperature and high pressure combustion gas including a mixture of air and aviation fuel is induced by the support device 22. In addition, the support device 22 may also be provided in the moving blade 18 of the intake fan 16. When the moving blade 18 of the intake fan 16 is supported, a flow of air is induced by the support device 22.

The support device 22 includes a plurality of discharge units 23 that induces flows of the gas G by causing dielectric barrier discharge and an AC power supply 24 that applies an AC voltage to the plurality of discharge units 23. The AC power supply 24 may be provided separately for each of the discharge units 23. Alternatively, the AC power supply 24 may be provided for the plurality of discharge units 23 in common. Accordingly, the support device 22 has the plurality of discharge units 23 and at least one AC power supply 24.

Figure 2:
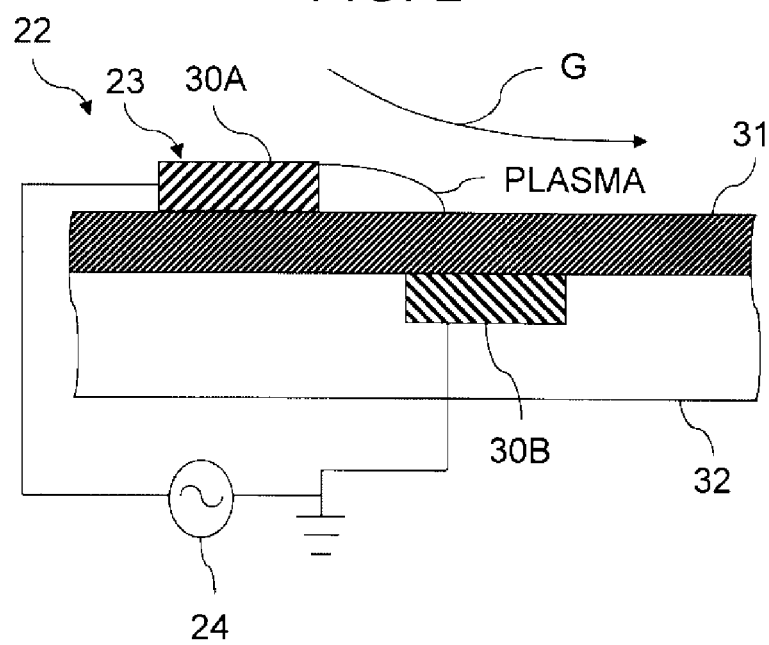
FIG. 2 illustrates the structure of a discharge unit illustrated in FIG. 1.

FIG. 2 illustrates the structure of the discharge unit 23 illustrated in FIG. 1.

Each of the discharge units 23 includes a first electrode 30A, a second electrode 30B, and a dielectric material 31. The second electrode 30B has a polarity opposite to that of the first electrode 30A. The dielectric material 31 is disposed between the first electrode 30A and the second electrode 30B. The first electrode 30A and the second electrode 30B are shifted from each other with the dielectric material 31 sandwiched therebetween to form a discharge area.

The first electrode 30A is disposed so as to be exposed in a space in which a flow of the gas G is to be induced. The second electrode 30B is fixed to a physical object 32 to which the discharge unit 23 is attached and covered with the dielectric material 31 so as not to be exposed to the space in which a flow of the gas G is to be induced. In addition, the second electrode 30B is grounded.

Then, when the AC voltage is applied across the first electrode 30A and the second electrode 30B by operating the AC power supply 24, plasma including electrons and positive ions is generated in the discharge area formed on the surface of the dielectric material 31 on which the first electrode 30A is disposed. As a result, a flow of the gas G toward the surface of the dielectric material 31 may be induced by the plasma. That is, a flow of the gas G may be induced by causing dielectric barrier discharge between the first electrode 30A and the second electrode 30B disposed on both sides of the dielectric material 31.

The discharge unit 23 that induces a flow of the gas G using such discharge is also referred to as a plasma actuator (PA). In particular, the PA that induces a flow of the gas G using dielectric barrier discharge may be referred to as a DBD-PA.

However, unlike a related-art plasma actuator including a pair of electrodes, the support device 22 includes the plurality of first electrodes 30A and the plurality of second electrodes 30B. In addition, the plurality of corresponding dielectric materials 31 or the common dielectric material 31 is disposed between the plurality of first electrodes 30A and the plurality of second electrodes 30B. That is, at least one dielectric material 31 is disposed between the plurality of first electrodes 30A and the plurality of second electrodes 30B. In addition, the plurality of second electrodes 30B may be covered with the plurality of dielectric materials 31. Alternatively, all or a part of the plurality of second electrodes 30B may be covered with the single dielectric material 31.

The AC voltage is applied across the plurality of first electrodes 30A and the plurality of second electrodes 30B disposed on both sides of the dielectric material 31 by the individual AC power supplies 24 or the common AC power supply 24. This causes dielectric barrier discharge between the plurality of first electrodes 30A and the plurality of second electrodes 30B to induce a flow of the gas G in each area in which dielectric barrier discharge is caused.

Accordingly, the support device 22 may include the plurality of plasma actuators or the plurality of plasma actuators having the common dielectric material 31 and the plurality of AC power supplies 24 or the common AC power supply 24 for applying the AC voltage to the plurality of plasma actuators.

One problem with the moving blades 11 of the compressor 3 and the turbine 5 to be supported by the support device 22 is how vortexes formed by flows of the gas G leaking from the clearance between the tips of the rotor blades 13 and the annular casing 15 are reduced. The energy efficiency of the compressor 3 and the turbine 5 may be improved if leak flows of the gas G from the clearance between the tips of the rotor blades 13 and the annular casing 15 is reduced.

Figure 3:
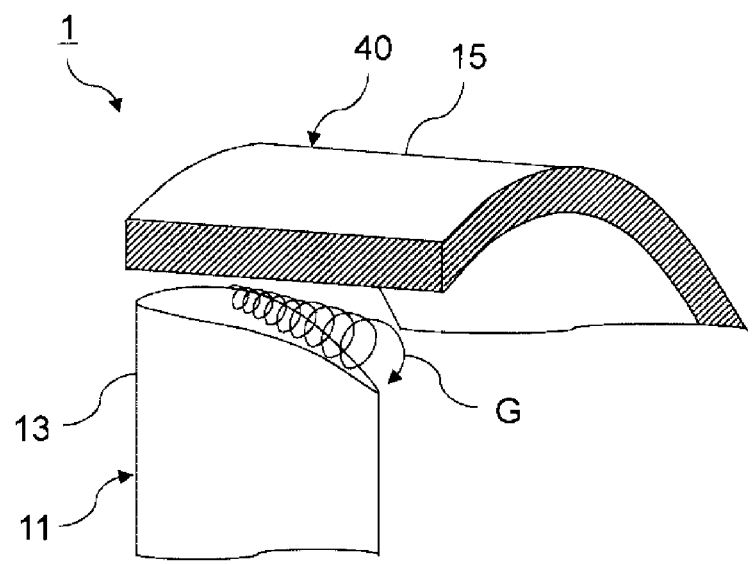
FIG. 3 illustrates leak flows of gas from the clearance between tips of rotor blades of a moving blade and an annular casing illustrated in FIG. 1.

FIG. 3 illustrates a leak flow of the gas G from the clearance between the tip of the rotor blade 13 of the moving blade 11 and the annular casing 15 illustrated in FIG. 1.

The moving blade 11 is adjacent to the annular casing 15, which is one static system 40 that is stationary with respect to the moving blade 11, with a slight clearance left in the rotating radius direction of the moving blade 11. That is, since the rotor blades 13 of the moving blade 11 disposed in the circumference move with respect to the annular casing 15, a clearance needs to be provided between the tips of the rotor blades 13 and the annular casing 15. As a result, as illustrated in FIG. 3, leak flows of the gas G are generated from the clearance between the tips of the rotor blades 13 and the annular casing 15. The leak flows of the gas G grow into vortexes and become a cause of reduction in the energy efficiency.

Accordingly, the support device 22 may induce flows of the gas G for preventing leak flows of the gas G from the clearance between the tips of the rotor blades 13 and the annular casing 15. That is, the support device 22 may function as a system for preventing leak flows of the gas G generated in the end parts of the plurality of rotor blades 13 provided in the moving blade 11.

If leak flows of the gas G are generated continuously, vortexes of leak flows grow. Accordingly, if the support device 22 induces intermittent flows of the gas G for inhibiting the growth of vortexes of leak flows of the gas G, leak flows of the gas G may be prevented. Dielectric barrier discharge needs to be caused intermittently to induce intermittent flows of the gas G.

Accordingly, at least one of the plurality of first electrodes 30A or the plurality of second electrodes 30B provided in the plurality of discharge units 23 of the support device 22 may be disposed apart from each other on the annular casing 15 surrounding the moving blade 11.

Figure 4:
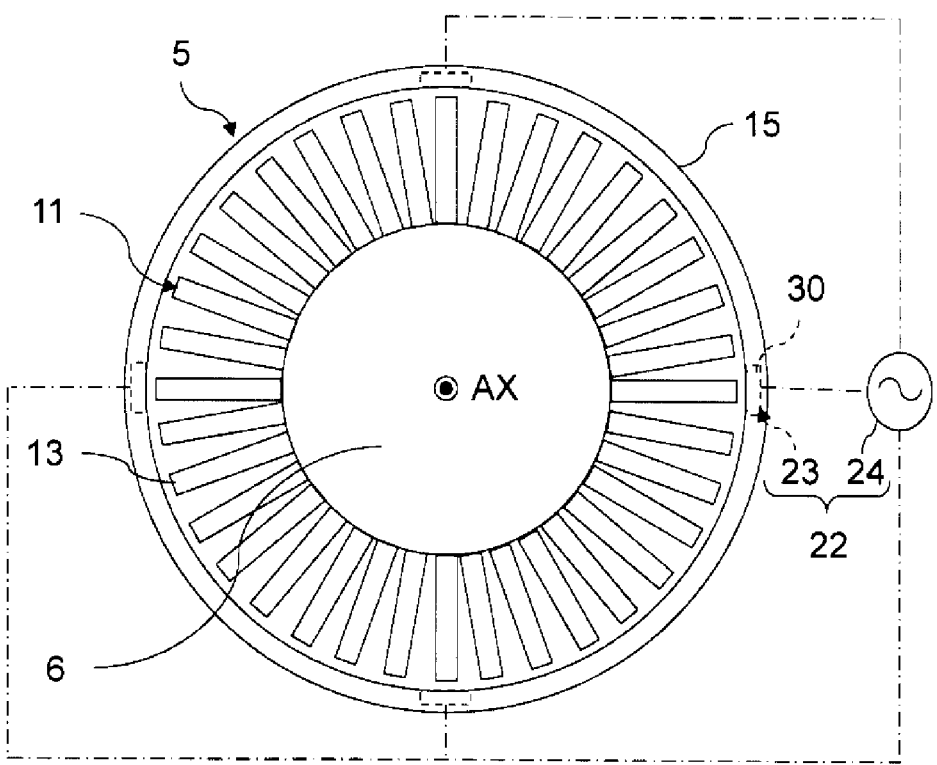
FIG. 4 is a front view of the moving blades of the turbine and illustrates a disposition instance of a plurality of discharge units provided in a support device for supporting the moving blades of the turbine illustrated in FIG. 1.

FIG. 4 is a front view of the moving blades 11 of the turbine 5 and illustrates a disposition instance of the plurality of discharge units 23 provided in the support device 22 for supporting the moving blades 11 illustrated in FIG. 1.

As illustrated in FIG. 4, a plurality of rotor blades 13 is disposed annularly on the rotary shaft 6 in each of the moving blades 11 of the turbine 5. The entire moving blades 11 in which a plurality of rotor blades 13 is fixed to the rotary shaft 6 are surrounded by the annular casing 15. The plurality of electrodes 30 provided in the plurality of discharge units 23 may be disposed apart from each other on the inner surface of the annular casing 15 surrounding the moving blades 11 of the turbine 5. In the instance illustrated in FIG. 4, the four electrodes 30 provided in the four discharge units 23 are disposed at regular intervals in the circumferential direction.

When the plurality of electrodes 30 provided in the support device 22 is disposed apart from each other in the rotational direction of the moving blades 11, dielectric barrier discharge occurs only in the parts in which the electrodes 30 are disposed, thereby inducing flows of the gas G only in the parts in which the electrodes 30 are disposed. Accordingly, when the rotary shaft 6 rotates and the rotor blades 13 provided in the moving blade 11 thereby rotates about a rotary shaft AX of the moving blade 11, flows of the gas G are induced at the tips of the rotor blades 13 only when the tips of the rotor blades 13 pass in the vicinity of the electrodes 30.

Accordingly, as seen from the coordinate systems fixed to each of the rotor blades 13, this is equivalent to intermittent occurrence of dielectric barrier discharge near the tips of the rotor blades 13 to induce flows of the gas G. The intermittent flows of the gas G induced near the tips of the rotor blades 13 may be used to prevent the leak flows of the gas G generated between the tips of the rotor blades 13 provided in the moving blade 11 and the annular casing 15.

Figure 5:
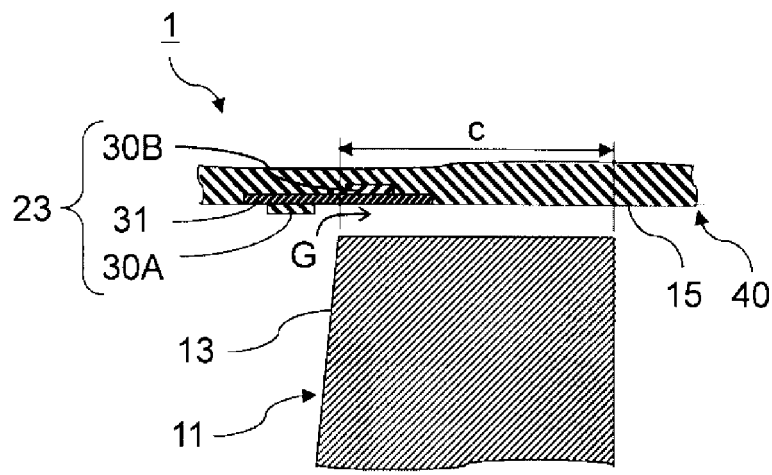
FIG. 5 is a vertical sectional view of the moving blade and illustrates a first disposition instance of a first electrode, a second electrode, and a dielectric material illustrated in FIG. 2.

FIG. 5 is a vertical sectional view of the moving blade 11 and illustrates a first disposition instance of the first electrode 30A, the second electrode 30B, and the dielectric material 31 illustrated in FIG. 2.

As illustrated in FIG. 5, both the plurality of first electrodes 30A as exposed electrodes exposed to the space in which the gas G is to be induced and the plurality of second electrodes 30B as coated electrodes covered with the dielectric material 31 may be disposed apart from each other in the rotational direction of the moving blade 11 on the annular casing 15 that is static system 40. More specifically, the plurality of discharge units 23 each including a pair of the first electrode 30A and the second electrode 30B coated with the dielectric material 31 may be disposed in the end part close to the inlet of the gas G toward the moving blade 11 in the clearance formed between the tips of the rotor blades 13 and the annular casing 15.

A pair of the first electrode 30A and the second electrode 30B to which the AC voltage is applied to cause dielectric barrier discharge may be disposed while being shifted in a direction of the rotary shaft AX of the moving blade 11. Specifically, the first electrode 30A that is an exposed electrode may be disposed in the inflow side of the gas G toward the moving blade 11 and the second electrode 30B that is a coated electrode may be disposed in a position shifted toward the outflow side of the gas G from the moving blade 11 with respect to the first electrode 30A.

It should be noted here that the dielectric material 31 may be provided for each of the discharge units 23 or the plurality of second electrodes 30B may be covered with the common dielectric material 31 by disposing the annular dielectric material 31 inside the annular casing 15. In addition, since the first electrode 30A and the second electrode 30B may be formed in thin films, the first electrode 30A and the second electrode 30B may be easily disposed even in a small clearance formed between the tips of the rotor blades 13 and the annular casing 15. Of course, the first electrode 30A and the second electrode 30B may be embedded in the surface layer of the casing 15 to prevent bumps and dips from being formed on the inner surface of the annular casing 15. This is also true of the dielectric material 31.

When the first electrode 30A and the second electrode 30B are disposed as illustrated in FIG. 5, a flow of the gas G from the first electrode 30A to the second electrode 30B may be induced by discharge. In this case, the direction of flows of the gas G induced by the discharge units 23 is approximately the same as the direction of a flow of the gas G passing through the moving blade 11. Accordingly, when a flow of the gas G is induced in a direction approximately the same as the direction of a flow of the gas G passing through the moving blade 11, the first electrode 30A and the second electrode 30B only need to be disposed as illustrated in FIG. 5.

Figure 6:
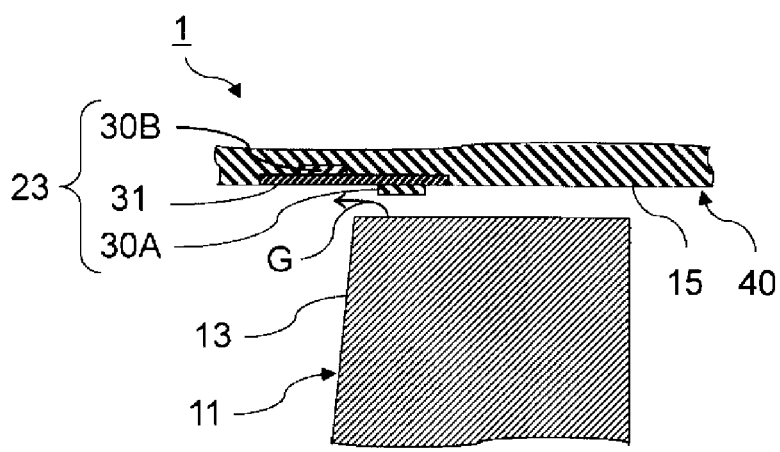
FIG. 6 is a vertical sectional view of the moving blade and illustrates a second disposition instance of the first electrode, the second electrode, and the dielectric material illustrated in FIG. 2.

FIG. 6 is a vertical sectional view of the moving blade 11 and illustrates a second disposition instance of the first electrode 30A, the second electrode 30B, and the dielectric material 31 illustrated in FIG. 2.

As illustrated in FIG. 6, the disposition of the first electrode 30A and the second electrode 30B in the direction of the rotary shaft AX of the moving blade 11 may be reversed from the disposition illustrated in FIG. 5. That is, the second electrode 30B that is an coated electrode may be disposed in the inflow side of the gas G toward the moving blade 11 and the first electrode 30A that is an exposed electrode may be disposed in a position shifted toward the outflow side of the gas G from the moving blade 11 with respect to the second electrode 30B.

When the first electrode 30A and the second electrode 30B are disposed as illustrated in FIG. 6, a flow of the gas G from the first electrode 30A to the second electrode 30B may be induced by discharge. In this case, the direction of flows of the gas G induced by the discharge units 23 is approximately opposite to the direction of a flow of the gas G passing through the moving blade 11. Accordingly, when a flow of the gas G is induced in a direction opposite to the direction of a flow of the gas G passing through the moving blade 11, the first electrode 30A and the second electrode 30B only need to be disposed as illustrated in FIG. 6.

Figure 7:
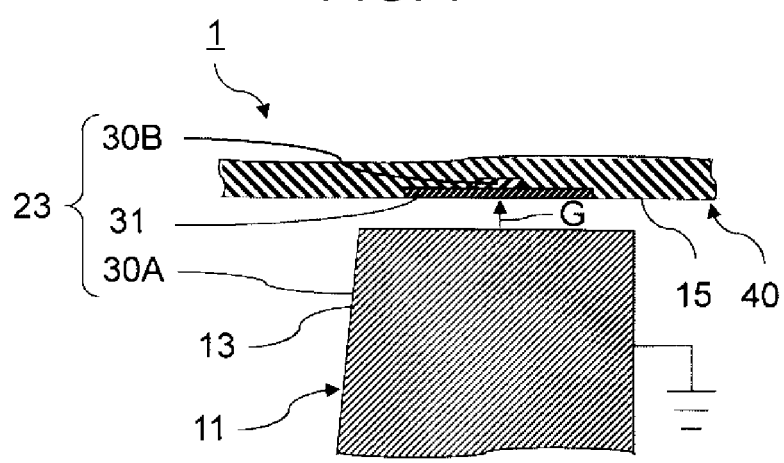
FIG. 7 is a vertical sectional view of the moving blade and illustrates a third disposition instance of the first electrode, the second electrode, and the dielectric material illustrated in FIG. 2.

FIG. 7 is a vertical sectional view of the moving blade 11 and illustrates a third disposition instance of the first electrode 30A, the second electrode 30B, and the dielectric material 31 illustrated in FIG. 2.

As illustrated in FIG. 7, one of the plurality of first electrodes 30A and the plurality of second electrodes 30B provided in the plurality of discharge units 23 may be disposed apart from each other in the rotational direction of the moving blade 11 on the annular casing 15 and the other of the plurality of first electrodes 30A and the plurality of second electrodes 30B may be the plurality of rotor blades 13 provided in the moving blade 11. Alternatively, the other of the plurality of first electrodes 30A and the plurality of second electrodes 30B may be attached to the rotor blades 13.

In the instance illustrated in FIG. 7, the second electrodes 30B that are coated electrodes are disposed apart from each other on the annular casing 15 and the plurality of rotor blades 13 is grounded and forms the first electrodes 30A that are exposed electrodes. Of course, the second electrodes 30B that are coated electrodes may be coated with the dielectric materials 31 and attached to the tips of the plurality of rotor blades 13 while the first electrodes 30A that are exposed electrodes are disposed apart from each other on the annular casing 15.

In this case, one of the first electrodes 30A and the second electrodes 30B provided in the discharge units 23 are replaced by the rotation of the moving blade 11. Then, when the distance between the first electrodes 30A and the second electrodes 30B change and reaches the distance that enables discharge, discharge occurs between the first electrode 30A and the second electrode 30B closest to each other. That is, discharge occurs between one of the first electrodes 30A and the second electrodes 30B disposed apart from each other in the rotational direction of the moving blade 11 on the annular casing 15 and the closest rotor blade 13. In addition, discharge occurs with other rotor blades 13 intermittently.

Then, a flow of the gas G is induced from the first electrode 30A that is an exposed electrode toward the second electrode 30B that is a coated electrode. Since the rotor blade 13 to which one of the first electrode 30A and the second electrode 30B is attached or the rotor blade 13 that becomes the first electrode 30A rotationally moves in the rotational direction of the moving blade 11, the first electrode 30A or the second electrode 30B also rotationally moves in the rotational direction of the moving blade 11. Accordingly, one of the first electrode 30A and the second electrode 30B approaches and then leaves the other. Therefore, the orientation of an induced flow of the gas G changes between the direction identical to the rotational direction of the moving blade 11 and the direction opposite to the rotational direction of the moving blade 11.

It should be noted here that the flow of the gas G once induced by discharge does not disappear instantaneously even if the discharge stops. Therefore, a flow of the gas G induced by discharge caused between the one rotor blade 13 and the first electrode 30A or the second electrode 30B attached to the annular casing 15 may be used to reduce a leak flow of the gas G at the tip of the subsequent rotor blade 13. Accordingly, when the first electrode 30A or the second electrode 30B is attached to the rotor blade 13, the first electrode 30A or the second electrode 30B does not need to be attached to all of the rotor blades 13.

Whether the first electrode 30A or the second electrode 30B is to be attached to all of the rotor blades 13 or whether the first electrode 30A or the second electrode 30B is to be attached to a part of the rotor blades 13 may be determined by wind-tunnel tests or simulations so that flows of the gas G required to reduce leak flows of the gas G at the tips of the rotor blades 13 may be induced according to the time until flows of the gas G intermittently induced by intermittent discharge disappear and the rotational speed of the rotor blades 13. This is true of the number of the rotor blades 13 to which the first electrode 30A or the second electrode 30B is attached when the first electrode 30A or the second electrode 30B is attached to a part of the rotor blades 13.

Accordingly, the number of the first electrodes 30A and the number of the second electrode 30B provided in the support device 22 do not necessarily coincide with each other. Then, when the first electrodes 30A or the second electrode 30B move and reach the interval that enables discharge, the plurality of discharge units 23 the number of which is equal to the number of discharges caused are formed. That is, the plurality of discharge units 23 the number of which is equal to the number of the first electrodes 30A or the second electrodes 30B attached to the annular casing 15 is provided in the support device 22.

When one of the first electrode 30A and the second electrode 30B provided in each of the discharge units 23 is disposed in the rotor blade 13 as illustrated in FIG. 7, discharge is caused only when the tip of the rotor blade 13 passes in the vicinity of the first electrode 30A or the second electrode 30B attached to the annular casing 15. That is, discharge is caused intermittently in the discharge units 23. Therefore, the power consumption may be reduced as compared with the case in which discharge is always caused by the discharge units 23 disposed apart from each other on the annular casing 15 as illustrated in FIG. 5 and FIG. 6.

As illustrated in FIG. 5 to FIG. 7, the orientations of flows of the gas G induced by the discharge units 23 are changed depending on the disposition of the first electrodes 30A and the second electrodes 30B. Therefore, the disposition of the first electrodes 30A and the second electrodes 30B may be determined so as to correspond to the orientations of flows of the gas G to be induced by the discharge units 23. The orientations of flows of the gas G to be induced by the discharge units 23 may be determined by wind-tunnel tests or simulations so that the orientations become effective to reduce leak flows of the gas G at the tips of the rotor blades 13.

Figure 8:
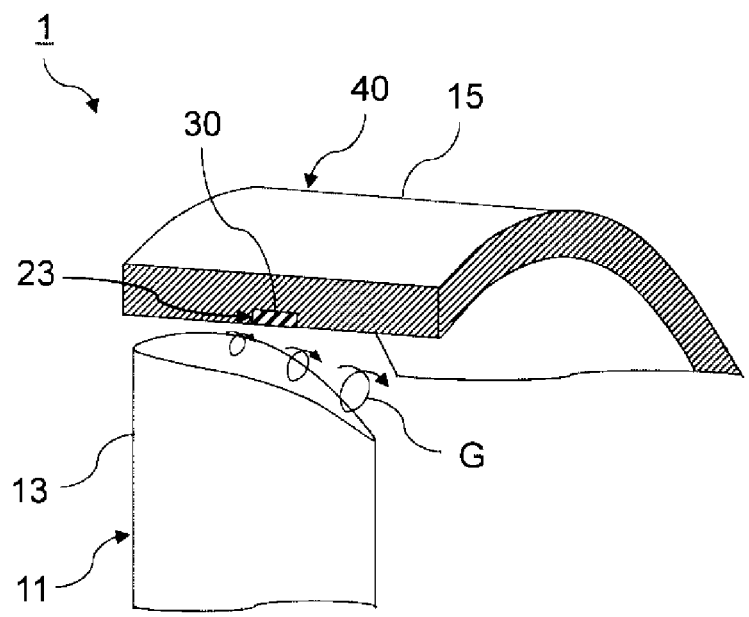
FIG. 8 illustrates how a leak flow of gas from the clearance between the tip of the rotor blade of the moving blade and the annular casing is reduced by inducing a flow of gas using the discharge unit illustrated in FIG. 1.

FIG. 8 illustrates how a leak flow of the gas G from the clearance between the tip of the rotor blade 13 of the moving blade 11 and the annular casing 15 is reduced by inducing a flow of the gas G in the discharge unit 23 illustrated in FIG. 1.

As described above, flows of the gas G are induced intermittently at the tips of the rotor blades 13 provided in the moving blade 11 by the operation of the plurality of discharge units 23 disposed apart from each other. The intermittent flows of the gas G induced by the plurality of discharge units 23 are given to the flow field of the gas G including leak flows of the gas G from the tips of the rotor blades 13 as agitation of the gas G having a constant cycle.

As a result, it is possible to inhibit the growth of leak flows of the gas G and prevent leak flows of the gas G. Specifically, intermittent flows of the gas G induced by the plurality of discharge units 23 are synthesized with leak flows of the gas G and intermittent vortexes of the gas G as illustrated in FIG. 8 are thereby formed.

It has been also shown from actual wind-tunnel tests that induction of intermittent flows of the gas G has higher reduction effects of leak flows of the gas G than induction of continuous flows of the gas G.

Reduction in leak flows of the gas G improves energy efficiency not only in the moving blades 11 of the compressor 3 and the turbine 5, but also in the moving blade 18 of the intake fan 16. Accordingly, the support device 22 may also be provided in the moving blade 18 of the intake fan 16 as described above.

Figure 9:
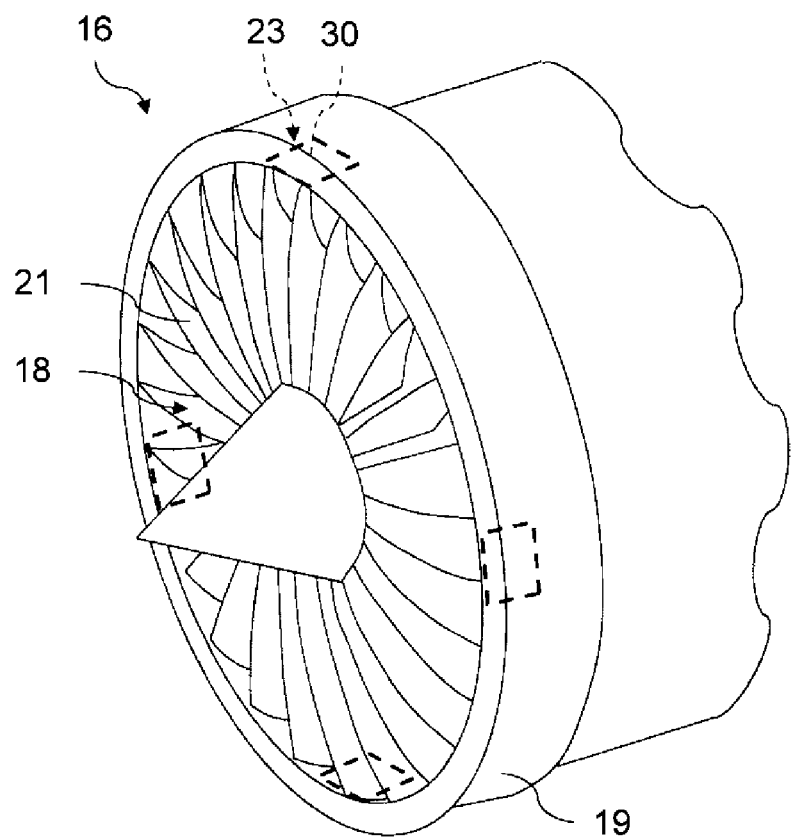
FIG. 9 is a perspective view of an intake fan and illustrates an instance in which the support device is provided in a moving blade of the intake fan illustrated in FIG. 1.

FIG. 9 is a perspective view of the intake fan 16 and illustrates an instance in which the support device 22 is provided in the moving blade 18 of the intake fan 16 illustrated in FIG. 1.

When the support device 22 is provided in the moving blade 18 of the intake fan 16, at least one of the plurality of first electrodes 30A or the plurality of second electrodes 30B provided in the plurality of discharge units 23 may be disposed apart from each other in the rotational direction of the intake fan 16 on the inner surface of the annular casing 19 such as a nacelle surrounding the moving blade 18 of the intake fan 16. Then, leak flows of the gas G from the tips of the rotor blades 21 provided in the moving blade 18 of the intake fan 16 may be reduced by flows of the gas G induced by the plurality of discharge units 23.

As described above, at least one of the plurality of first electrodes 30A or the plurality of second electrodes 30B provided in the plurality of discharge units 23 may be disposed apart from each other on the inner surface of at least one of the annular casing 19 surrounding the moving blade 18 of the intake fan 16, the annular casing 15 surrounding the moving blade 11 of the compressor 3, or the annular casing 15 surrounding the moving blade 11 of the turbine 5 of the gas turbine engine 1 provided in the aircraft 2.

This may reduce at least one of leak flows of the gas G from the clearance between the tips of the rotor blades 21 provided in the moving blade 18 of the intake fan 16 and the annular casing 19, leak flows of the gas G from the clearance between the tips of the rotor blades 13 provided in the moving blade 11 of the compressor 3 and the annular casing 15, or leak flows of the gas G from the clearance between the tips of the rotor blades 13 provided in the moving blade 11 of the turbine 5 and the annular casing 15.

The number of the plurality of electrodes 30 disposed apart from each other on the annular casing 15 surrounding the moving blade 11 of the compressor 3 or the turbine 5 and the lengths of the electrodes 30 in the rotational direction of the moving blade 11 are preferably determined so that intermittent flows of the gas G for preventing leak flows of the gas G are induced by dielectric barrier discharge between the tips of the rotor blades 13 provided in the moving blade 11 of the compressor 3 or the turbine 5 and the annular casing 15 by the rotation of the rotor blades 13 provided in the moving blade 11 of the compressor 3 or the turbine 5 about the rotary shaft AX.

This is also true of the number of the plurality of electrodes 30 disposed apart from each other on the annular casing 19 surrounding the moving blade 18 of the intake fan 16 and the lengths of the electrodes 30 in the rotational direction of the moving blade 18 of the intake fan 16. Accordingly, how to determine the number and the lengths of the plurality of electrodes 30 disposed apart from each other on the annular casing 15 surrounding the moving blade 11 of the compressor 3 or the turbine 5 will be described below. It should be noted that the description is also true of the plurality of electrodes 30 disposed apart from each other on the annular casing 19 surrounding the moving blade 18 of the intake fan 16.

The appropriate number of the electrodes 30 and the appropriate lengths of the electrodes 30 for preventing leak flows of the gas G change depending on the number of revolutions of the moving blade 11. Accordingly, it is appropriate that the number of at least one of the plurality of first electrodes 30A or the plurality of second electrodes 30B disposed apart from each other on the casing 15 of the moving blade 11 is equal to an appropriate number associated with the number of revolutions of the moving blade 11. Similarly, it is appropriate to set the lengths of the electrodes 30 (at least one of the plurality of first electrodes 30A or the plurality of second electrodes 30B disposed apart from each other on the casing 15 of the moving blade 11) in the rotational direction of the moving blade 11 to be appropriate lengths associated with the number of revolutions of the moving blade 11.

The number of the electrodes 30 provided in the plurality of discharge units 23 and the lengths of the electrodes 30 may be determined by wind-tunnel tests or simulations for checking reduction effects of leak flows of the gas G using a model simulating the actual moving blade 11. Alternatively, the number and the lengths may be determined more easily by using an equivalent model as described below.

When attention is focused on one rotor blade 13, a flow of the gas G is induced near the tip of the rotor blade 13 sequentially by the rotation of the rotor blade 13 from the plurality of electrodes 30. This is equivalent to disposing one plasma actuator that is stationary with respect to the rotor blade 13 near the tip of the rotor blade 13 and applying a burst wave as an AC voltage across the electrodes of the disposed plasma actuator.

Figure 10:
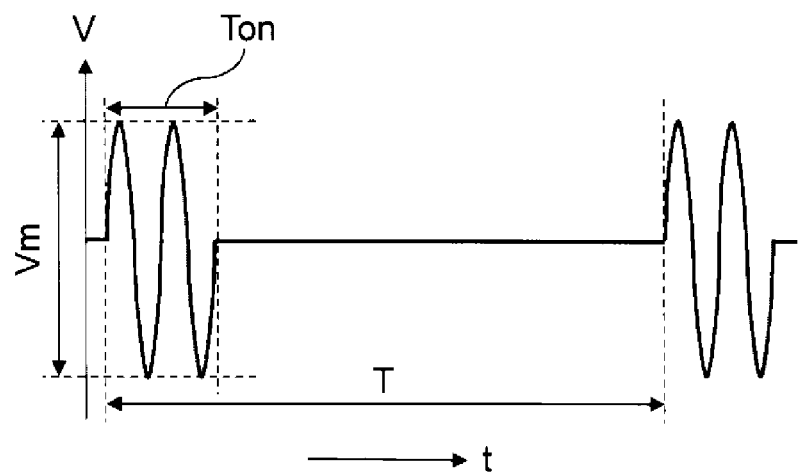
FIG. 10 is a graph illustrating the waveform of a typical burst wave.

FIG. 10 is a graph illustrating the waveform of a typical burst wave.

In FIG. 10, the vertical axis represents the voltage V and the horizontal axis represents the time t. A burst wave is a wave having a period in which the amplitude changes and a period in which the amplitude does not change are repeated in a constant burst cycle T as illustrated in FIG. 10. Accordingly, the waveform of the AC voltage is a burst wave, a period Ton for which the AC voltage having an amplitude Vm is continuously applied is intermittently repeated in the burst cycle T. The ratio (Ton/T) of the application period Ton of AC voltage to the burst cycle T corresponds to the duty ratio and referred to as a burst ratio BR.

The amplitude Vm of the AC voltage may be temporally variable instead of constant. However, the voltage control of the AC power supply 24 is easy when the amplitude Vm is constant as illustrated in FIG. 10. Therefore, the amplitude of the AC voltage is assumed to be constant in the following description.

The burst cycle T of the AC voltage applied across the electrodes of the equivalent model corresponds to the intervals at which the application of the AC voltage is repeated intermittently. Accordingly, in the actual support device 22, this period corresponds to the time from when the tip of one rotor blade 13 reaches the vicinity of one electrode 30 to when this tip reaches the vicinity of another electrode 30 adjacent thereto. Therefore, the burst cycle T of the equivalent model is the time uniquely determined by using the interval between the electrodes 30 disposed apart from each other in the actual support device 22 and the peripheral speed at the tip of the rotor blade 13 as parameters.

Conversely, if the burst cycle T for providing good reduction effects of leak flows from the tip of the rotor blade 13 is identified in the equivalent model, it is possible to determine the desirable interval between the electrodes 30 for providing good reduction effects of leaking flows of the gas G so as to correspond to the peripheral speed at the tip of the rotor blade 13 in the actual support device 22.

On the other hand, the period Ton for which the AC voltage is continuously applied in the equivalent model corresponds to the period from when the effect of discharge is received from the electrode 30 when the tip of the rotor blade 13 passes in the vicinity of one electrode 30 in the actual support device 22 to when the effect of discharge disappears. Accordingly, the application period Ton of the AC voltage in the equivalent model is the time determined uniquely by using the length of the electrode 30 in the rotational direction of the rotor blade 13 and the peripheral speed at the tip of the rotor blade 13 as parameters in the actual support device 22.

Conversely, if the application period Ton of the AC voltage for providing good reduction effects of leak flows from the tip of the rotor blade 13 is identified in the equivalent model, it is possible to determine the desirable lengths of the electrodes 30 in the rotational direction of the rotor blade 13 for providing good reduction effects of leaking flows of the gas G so as to correspond to the peripheral speed at the tip of the rotor blade 13 in the actual support device 22.

Therefore, if an equivalent model that simulates one rotor blade 13 disposed apart from the casing 15 with a clearance left and the plasma actuator that is stationary with respect to the rotor blade 13 is created, it is possible to perform wind-tunnel tests or simulations that apply a burst wave as an AC voltage across the electrodes of the plasma actuator.

Then, the condition of a burst wave capable of satisfactorily reducing a leak flow of the gas G from the tip of the rotor blade 13 may be obtained using the equivalent model. That is, it is possible to obtain a burst cycle T or a burst frequency 1/T of an AC voltage and an application period Ton or a burst ratio BR (=Ton/T) of the AC voltage having a burst waveform capable of inducing an intermittent flow of the gas G contributing to reduction in a leak flow of the gas G from the tip of the rotor blade 13.

This may determine the interval and the number of the electrodes 30 and the lengths of the electrodes 30 in the rotational direction of the rotor blade 13 in the actual support device 22 so as to correspond to the condition of the burst wave obtained by the equivalent model. Therefore, it is possible to determine the interval and the number of the electrodes 30 and the lengths of the electrodes 30 (in the rotational direction of the rotor blade 13) capable of satisfactorily reducing leak flows of the gas G without creating large-scale models of the compressor 3, the turbine 5, and the like.

Here, the case in which the burst frequency 1/T is made dimensionless and the optimum value of the dimensionless burst frequency is obtained via wind-tunnel tests or simulations using an equivalent model will be described. Of course, the burst cycle T may be the target.

The burst frequency 1/T in the equivalent model may be made dimensionless by using, for instance, a mainstream velocity U of the gas G flowing to the moving blade 11 in the actual support device 22 and a chord length c of the rotor blade 13 as illustrated in FIG. 5. A burst frequency F1 made dimensionless by the mainstream velocity U of the gas G flowing to the moving blade 11 and the chord length c of the rotor blade 13 is represented by expression (1).

$$F1=(1/T)/(U/c) \qquad (1)$$

Alternatively, the burst frequency 1/T in the equivalent model may also be made dimensionless by the number f of revolutions of the rotor blade 13 in the actual support device 22. A burst frequency F2 made dimensionless by the number f of revolutions of the rotor blade 13 is represented by expression (2).

$$F2=(1/T)/f \quad (2)$$

Then, it is possible to obtain burst frequencies F1_opt and F2_opt having been made dimensionless when leak flows of the gas G from the clearance between the tips of the rotor blades 13 and the casing 15 are minimized using wind-tunnel tests or simulations such as computational fluid dynamics (CFD) analysis using an equivalent model.

When the number of the electrodes 30 disposed apart from each other on the casing 15 is n in the actual support device 22, the tip of the rotor blade 13 passes in the vicinity of discharge caused by the n electrodes 30 while the rotor blade 13 makes one turn. Therefore, the burst frequency 1/T not subjected to dimensionless processing in the equivalent model may be considered to be the same as the product (f*n) of the number f of revolutions of the rotor blade 13 and the number n of the electrodes 30 disposed apart from each other on the casing 15.

Accordingly, when the optimum burst frequency F1_opt made dimensionless by the mainstream velocity U of the gas G and the chord length c of the rotor blade 13 is obtained, the optimum number n_opt of the electrodes 30 may be calculated by expression (3) instead of expression (1).

$$n\_opt = F1\_opt*(U/c)/f \quad (3)$$

On the other hand, when the optimum burst frequency F2_opt made dimensionless by the number f of revolutions of the rotor blade 13 is obtained, the optimum number n_opt of the electrodes 30 may be calculated by expression (4) instead of expression (2).

$$n\_opt = F2\_opt \quad (4)$$

After the optimum number n_opt of the electrodes 30 is obtained, the interval between typical positions of the electrodes 30 may be obtained based on the radius of a circle in which the electrodes 30 are arranged.

In addition, the burst ratio BR in the equivalent model corresponds to the ratio of the period for which discharge is caused at the tip of the rotor blade 13. Accordingly, the burst ratio BR may be represented by expression (5) in which the length of the electrode 30 in the rotational direction of the rotor blade 13 is l and the radius of the moving blade 11 is r as illustrated in FIG. 4 by assuming discharge to be caused only when the rotor blade 13 passes in the vicinity of the electrode 30 and ignoring the difference between the radius of the circle in which the electrodes 30 are arranged and the radius of the moving blade 11.

$$BR=(n*l)/(2\pi r) \quad (5)$$

Accordingly, by obtaining the optimum burst ratio BR_opt at which leak flows of the gas G from the clearance between the tips of the rotor blades 13 and the annular casing 15 are minimized using wind-tunnel tests or simulations such as CFD analysis using an equivalent model, the optimum length l_opt of the electrodes 30 may be obtained as indicated by expression (6) based on the optimum burst ratio BR_opt, the optimum number n_opt of the electrodes 30, and the radius r of the moving blade 11.

$$l\_opt=2\pi r*BR\_opt/n\_opt \quad (6)$$

As described above, the appropriate number and lengths of the electrodes 30 corresponding to the number f of revolutions of the rotor blade 13 may be determined via wind-tunnel tests or simulations such as CFD analysis using an equivalent model. It should be noted here that, depending on the results of wind-tunnel tests or simulations using an equivalent model or wind-tunnel tests or simulations using no equivalent model, the plurality of electrodes 30 having different lengths in the rotational direction of the rotor blades 13 may be disposed apart from each other on the casing 15 or the plurality of electrodes 30 may be disposed apart from each other at irregular intervals on the casing 15.

The rotor support device 22 described above includes the plurality of discharge units 23 disposed discretely on the annular casing 15 for protecting the moving blade 11, which is one of typical devices (rotors) provided in the aircraft 2. The rotor support device 22 is configured to induce flows of the gas G similar to the flows of the gas G that can be induced when an AC voltage having a burst waveform is applied to the electrodes near the tips of the rotor blades 13 using the rotation of the rotor blades 13 provided in the moving blade 11.

(Effects)

Therefore, the rotor support device 22 may effectively reduce leak flows of the gas G at the blade ends of the rotor blades 13 provided in the moving blade 11 of the compressor 3 and the turbine 5 provided in the gas turbine engine 1. As a result, the performance of the gas turbine engine 1 may be improved. In addition, the performance of the intake fan 16 for capturing air into the gas turbine engine 1 may also be improved similarly by including the support device 22.

Moreover, the interval and the period for inducing flows of the gas G may be determined appropriately by adjusting the number of the discharge units 23 and the lengths of the electrodes 30 provided in the discharge units 23. Therefore, it is possible to intermittently induce flows of the gas G at appropriate intervals and in an appropriate period without providing a control circuit for a voltage waveform for generating the AC voltage having a burst waveform. As a result, since leak flows of the gas G generated at the blade end of the rotor are reduced, it is possible to prevent increase in the weight of the aircraft 2 because of additional installation of the circuit while improving the performance of the gas turbine engine 1. In addition, since the AC voltage to be applied to the discharge units 23 may have a continuous wave instead of a burst wave, the control of the voltage may be simplified significantly.

Second Example

Figure 11:
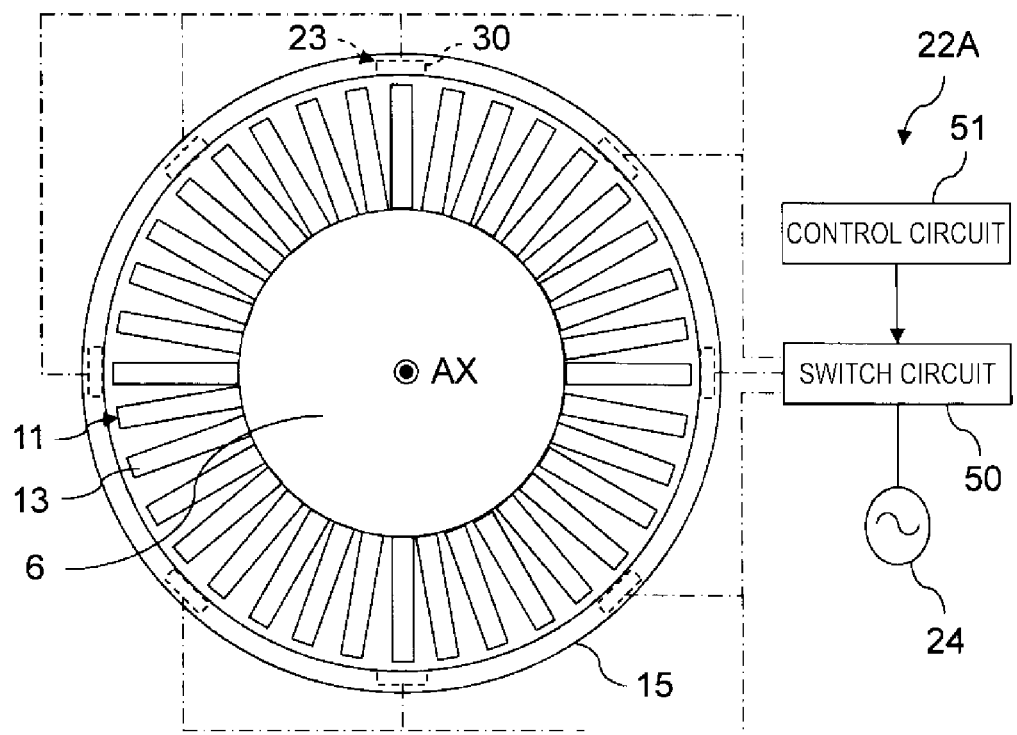
FIG. 11 is a front view illustrating a rotor to which a support device according to a second example of the present invention has been attached.

FIG. 11 is a front view illustrating a rotor to which a support device according to a second example of the present invention has been attached.

A rotor support device 22A according to the second example illustrated in FIG. 11 is different from the support device 22 according to the first example in that the discharge units 23 that causes discharge may be selected. Since the other components and effects of the support device 22A according to the second example are substantially the same as in the support device 22 according to the first example, the same components or the corresponding components are given the same reference numerals to omit descriptions.

The support device 22A according to the second example further includes a switch circuit 50 and a control circuit 51 in addition to the plurality of discharge units 23 and the AC power supply 24. The plurality of discharge units 23 include the plurality of first electrodes 30A exposed to the space in which the gas G is to be induced and the plurality of second electrodes 30B covered with the dielectric material 31 as in the first example. The plurality of electrodes 30 including at least one of the plurality of first electrodes 30A or the plurality of second electrodes 30B is disposed on the inner surface of the annular casing 15 for protecting the moving blade 11.

The switch circuit 50 is coupled between the plurality of discharge units 23 and the AC power supply 24. Then, the discharge unit 23 to be coupled to the AC power supply 24 may be selected via switching operation by the switch circuit 50. That is, the electrode 30 to which the AC voltage from the AC power supply 24 is applied may be selected from the plurality of electrodes 30 disposed apart from each other on the casing 15 via switching operation by the switch circuit 50.

The control circuit 51 automatically controls the switch circuit 50. The control circuit 51 may be implemented by a computing circuit to which computer programs have been read. Therefore, the discharge unit 23 that induces a flow of the gas G via discharge may be selected automatically according to a desired algorithm from the plurality of discharge units 23 disposed apart from each other.

As described in the first example, the appropriate number of the electrodes 30 disposed apart from each other on the inner surface of the annular casing 15 changes depending on the number of revolutions of the moving blade 11. Therefore, it is possible to change the number of the electrodes 30 that cause discharge using the switch circuit 50 so that the reduction effect of leak flows of the gas G from the tips of the rotor blades 13 may be obtained even when the number of revolutions of the moving blade 11 changes.

Specifically, the number of revolutions of the moving blade 11 and the electrodes 30 that cause discharge may be stored in the control circuit 51 in association with each other, in a table format or as a function. This enables the control circuit 51 to control the switch circuit 50 in accordance with the number of revolutions of the moving blade 11 so that the electrodes 30 associated with the number of revolutions of the moving blade 11 are automatically selected as the electrodes 30 to which the AC voltage is applied. That is, the positions at which flows of the gas G are induced by discharge may be automatically changed depending on the number of revolutions of the moving blade 11.

Therefore, if the electrodes 30 are spread closely at reference intervals, the positions at which flows of the gas G are induced may be increased. In addition, variations in combinations of the electrodes 30 that cause discharge by receiving an AC voltage may be increased. As a result, flexibility in selecting the number of the electrodes 30 that cause discharge may be improved. In this case, even when the number of revolutions of the moving blade 11 largely changes, the effect of reducing the leak flows of the gas G may be maintained. In addition, the number of the electrodes 30 that cause discharge may be controlled flexibly according to the number of revolutions of the moving blade 11 in order to further improve the effect of reducing the leak flows of the gas G.

Of course, the support device 22A according to the second example may also be applied to not only the moving blades 11 of the compressor 3 and the turbine 5, but also the moving blade 18 of the intake fan 16 to be supported.

Third Example

Figure 12:
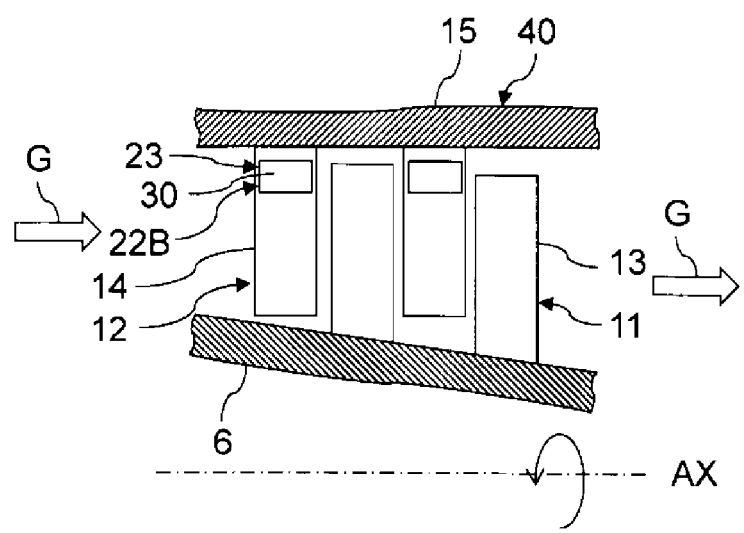
FIG. 12 is a side view of stationary blades and illustrates the attachment positions of rotor support devices according to a third example of the present invention.

FIG. 12 is a side view of stationary blades and illustrates the attachment positions of rotor support devices according to a third example of the present invention.

A rotor support device 22B according to the third example illustrated in FIG. 12 is different from the support device 22 according to the first example in that the plurality of discharge units 23 is disposed apart from each other in the stationary blade 12. Since the other components and effects of the support device 22B according to the third example are substantially the same as in the support device 22 according to the first example, the same components or the corresponding components are given the same reference numerals to omit descriptions.

The static system 40 that is stationary with respect to the moving blade 11 may be the casing 15 disposed apart in the radial direction of the moving blade 11, and the stationary blade 12 disposed apart in the direction of the rotary shaft AX of the moving blade 11. Therefore, at least one of the plurality of first electrodes 30A or the plurality of second electrodes 30B provided in the plurality of discharge units 23 may be disposed apart from the stationary blade 12 adjacent to the moving blade 11 provided in at least one of the compressor 3 or the turbine 5.

When the plurality of discharge units 23 is disposed apart from each other in the stationary blade 12, flows of the gas G passing through the moving blade 11 and the stationary blade 12 can be adjusted. In other words, the number and the lengths of the electrodes 30 to be disposed apart from each other may be determined so that the desired flow adjustment effect of the gas G is obtained.

Specifically, the positions, the number, and the lengths of the electrodes 30 disposed apart from each other in the stationary blade 12 may be determined so that intermittent flows of the gas G for improving energy efficiency are induced between the rotor blade 13 and the stationary blade 12 by dielectric barrier discharge when the aircraft 2 is flying at stable speed by the rotation of the rotor blades 13 provided in the moving blade 11 about the rotary shaft AX of the moving blade 11.

Alternatively, the positions, the number, and the lengths of the electrodes 30 disposed apart from each other in the stationary blade 12 may be determined so that intermittent flows of the gas G for stabilizing unstable speed are induced between the rotor blade 13 and the stationary blade 12 by dielectric barrier discharge when the aircraft 2 is flying at unstable speed by the rotation of the rotor blades 13 provided in the moving blade 11 about the rotary shaft AX of the moving blade 11. That is, the support device 22B may induce intermittent flows of the gas G for reducing inlet distortion, which is fluctuations in the speed distribution, the direction distribution, or the pressure distribution of flows of gas G that may be generated at the inlet of the compressor 3 or the turbine 5.

Of course, the positions, the number, and the lengths of the electrodes 30 disposed apart from each other in the stationary blade 12 may be determined so as to induce intermittent flows of the gas G for reducing leak flows of the gas G from the tips of the rotor blades 13 provided in the moving blade 11.

Figure 13:
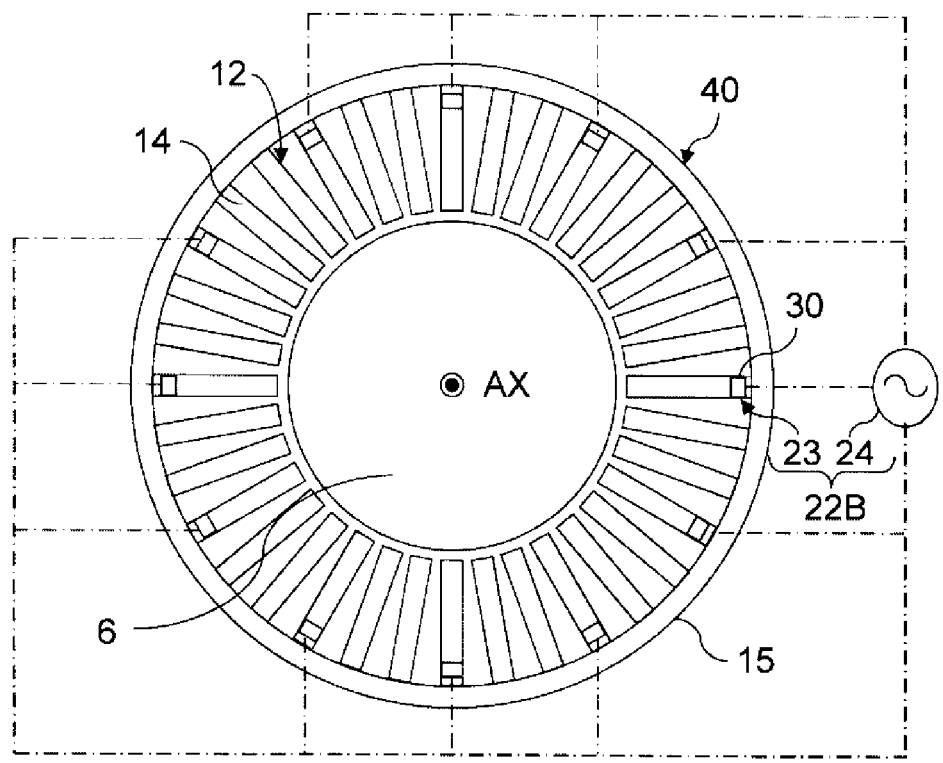
FIG. 13 is a front view of the stationary blade and illustrates a first disposition instance of the electrodes illustrated in FIG. 12.

FIG. 13 is a front view of the stationary blade 12 and illustrates a first disposition instance of the electrodes 30 illustrated in FIG. 12.

When the plurality of electrodes 30 is disposed apart from each other in the plurality of stator vanes 14 provided in the stationary blade 12, the position of each of the electrodes 30 may be identified by the position in the rotational direction of the moving blade 11 and the position in the radial direction of the stationary blade 12, that is, the position in the longitudinal direction of the stator vane 14. In other words, the position of each of the electrodes 30 may be determined as a two-dimensional position including the position in the rotational direction of the moving blade 11 and the position in the longitudinal direction of the stator vane 14.

Therefore, the electrodes 30 may be attached to the plurality of stator vanes 14, which is all or a part of the plurality of stator vanes 14 provided in the stationary blade 12. That is, the electrodes 30 may be attached to the plurality of stator vanes 14 which is as many as the electrodes 30 to be attached. This enables the plurality of electrodes 30 to be disposed apart from each other in the rotational direction of the moving blade 11 as illustrated in FIG. 13.

On the other hand, as illustrated in FIG. 13, if the electrodes 30 are attached to the parts of the stator vanes 14 (that is, the tip parts close to the casing 15 to which the stator vanes 14 are fixed) adjacent to the tips of the rotor blades 13 in the direction of the rotary shaft AX of the moving blade 11, flows of the gas G may be induced near the tips of the rotor blades 13. Therefore, as seen from the coordinate system fixed to each of the rotor blades 13 rotating about the rotary shaft AX of the moving blade 11, flows of the gas G are intermittently induced near the tips of the rotor blades 13 when the tips of the rotor blades 13 pass in the vicinity of the different electrodes 30.

Accordingly, by appropriately determining the disposition of the first electrodes 30A and the second electrodes 30B, the number of the electrodes 30 disposed apart from each other in the stationary blade 12, and the lengths of the electrodes 30 in the direction of the rotary shaft AX of the moving blade 11, intermittent flows of the gas G for reducing leak flows of the gas G from the tips of the rotor blades 13 provided in the moving blade 11 may be induced as seen from the coordinate system fixed to each of the rotor blades 13 of the moving blade 11.

That is, the support device 22B according to the third example may function as a system for preventing leak flows of the gas G generated in the end parts of the plurality of rotor blades 13 provided in the moving blade 11 as the support device 22 according to the first example.

Figure 14:
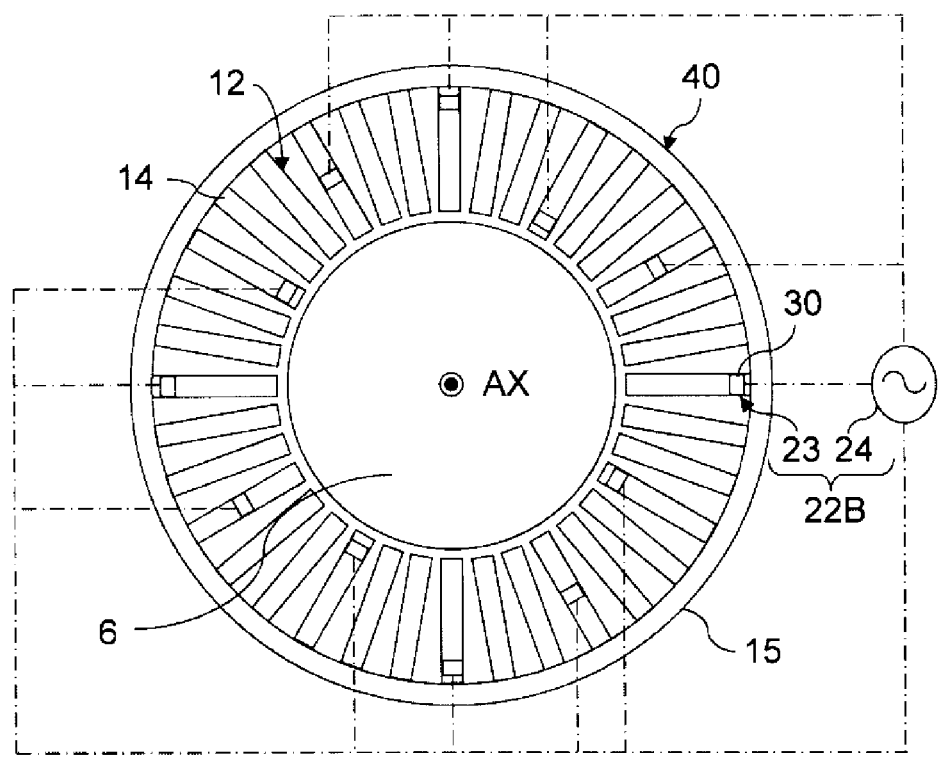
FIG. 14 is a front view of the stationary blade and illustrates a second disposition instance of the electrodes illustrated in FIG. 12.

FIG. 14 is a front view of the stationary blade 12 and illustrates a second disposition instance of the electrodes 30 illustrated in FIG. 12.

As illustrated in FIG. 14, the electrodes 30 may be attached to parts other than the end parts of the stator vanes 14 close to the casing 15. Specifically, as illustrated in FIG. 14, the electrodes 30 may be attached to the different stator vanes 14 so that the positions in the longitudinal direction of the stator vanes 14 are different from each other.

In this case, adjustment of flows of the gas G passing through the moving blade 11 and the stationary blade 12 may be performed as described above instead of reduction in leak flows of the gas G generated in the end parts of the rotor blades 13 provided in the moving blade 11. That is, intermittent flows of the gas G for adjustment of flows of the gas G passing through the moving blade 11 and the stationary blade 12 may be induced by the support device 22B as seen from the coordinate system fixed to each of the rotor blades 13 of the moving blade 11.

The number of the electrodes 30 disposed apart from each other in the stationary blade 12, that is, the stator vanes 14 to which the electrodes 30 are attached and the positions of the electrodes 30 in the longitudinal direction of the stator vanes 14 may be determined so as to induce flows of the gas G preferable for adjustment of flows of the gas G via wind-tunnel tests or simulations.

Depending on the results of wind-tunnel tests or simulations, by attaching the plurality of electrodes 30 in different positions in the longitudinal direction of one stator vane 14, flows of the gas G may be induced in the plurality of different positions in the longitudinal direction of the stator vane 14. In addition, the plurality of electrodes 30 may be attached in different positions in the longitudinal direction of one stator vane 14 so that the effects of reduction in leak flows of the gas G generated in the end parts of the rotor blades 13 provided in the moving blade 11 and adjustment of flows of the gas G passing through the moving blade 11 and the stationary blade 12 can be obtained.

Of course, the support device 22B according to the third example may also be applied to not only the moving blades 11 of the compressor 3 and the turbine 5, but also the moving blade 18 of the intake fan 16 to be supported. In addition, the plurality of electrodes 30 provided in the support device 22A according to the second example may be provided in the stationary blade 12 instead as in the third example. In addition, the plurality of electrodes 30 disposed apart from each other may be provided in both the stationary blade 12 and the annular casing 15.

Fourth Example

Figure 15:
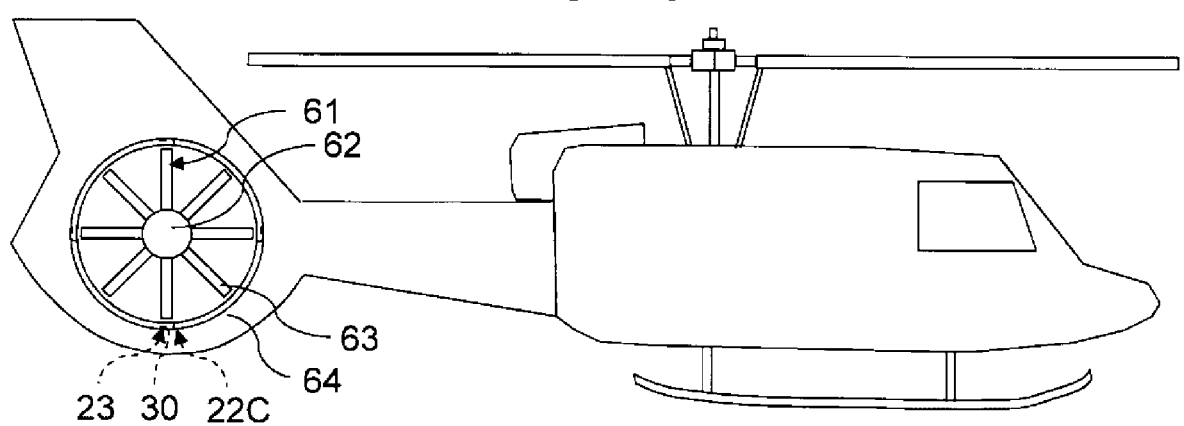
FIG. 15 illustrates the attachment position of a rotor support device according to a fourth example of the present invention.

FIG. 15 illustrates the attachment position of a rotor support device according to a fourth example of the present invention.

A rotor support device 22C according to the fourth example illustrated in FIG. 15 is different from the support device 22 according to the first example in that the rotor to be supported is a tail rotor 61 of a rotary-wing aircraft 60. Since the other components and effects of the support device 22C according to the fourth example are substantially the same as in the support device 22 according to the first example, the same components or the corresponding components are given the same reference numerals to omit descriptions.

When the aircraft 2 is the rotary-wing aircraft 60 such as a helicopter, the tail rotor 61 is provided as a rotary-wing. The tail rotor 61 also has a structure in which a plurality of blades 63 is provided on the rotary shaft 62. The tail rotor 61 may be protected by an annular casing 64 such as a duct or a nacelle. A fan such as the tail rotor 61 protected by the annular casing 64 is also referred to as a ducted fan.

When blades 63 provided in the tail rotor 61 of the rotary-wing aircraft 60 are protected by the casing 64, reduction in leak flows of air from the clearance between the blades 63 and the casing 64 also leads to the improvement of energy efficiency.

Therefore, the tail rotor 61 of the rotary-wing aircraft 60 may be supported by the support device 22C. Specifically, at least one (electrodes 30) of the plurality of first electrodes 30A or the plurality of second electrodes 30B provided in the plurality of discharge units 23 of the support device 22C may be disposed apart from each other on the annular casing 64 surrounding the tail rotor 61 of the rotary-wing aircraft 60.

This may intermittently induce flows of air (gas G) near the tips of the blades 63 that are rotating via the same principle as in the first example. By inducing flows of air intermittently, leak flows of air from the clearance between the blades 63 of the tail rotor 61 and the casing 64 may be reduced. As a result, the energy efficiency of the tail rotor 61 may be improved.

Fifth Example

Figure 16:
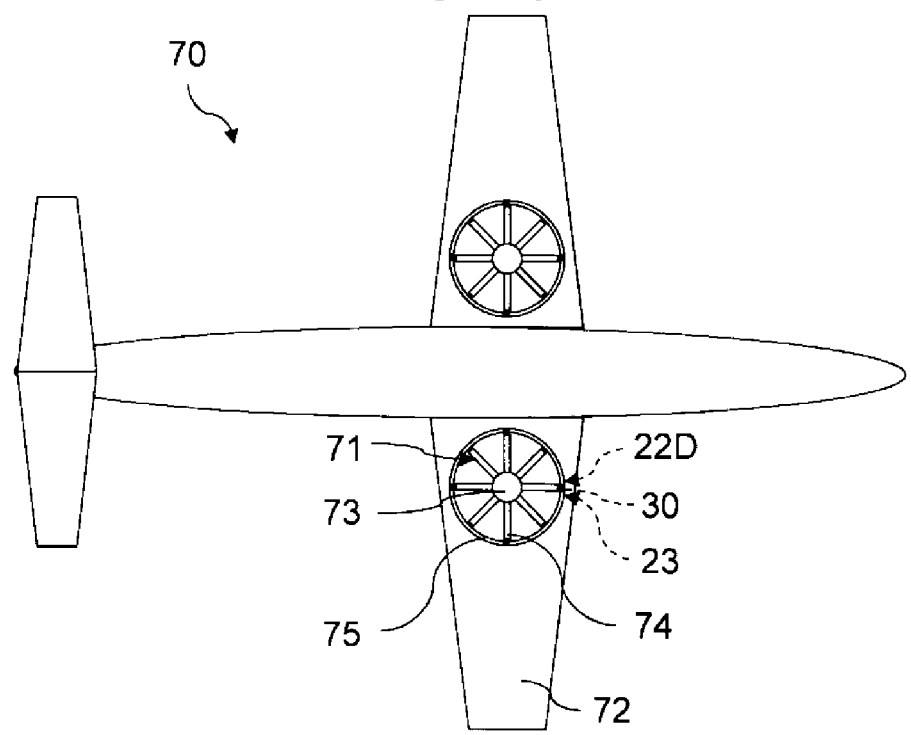
FIG. 16 illustrates an instance of the attachment position of a rotor support device according to a fifth example of the present invention.

FIG. 16 illustrates an instance of the attachment position of a rotor support device according to a fifth example of the present invention.

A rotor support device 22D according to the fifth example illustrated in FIG. 16 is different from the support device 22 according to the first example in that the rotors to be supported are lift fans 71 provided in a fixed wing aircraft 70. Since the other components and effects of the support device 22D according to the fifth example are substantially the same as in the support device 22 according to the first example, the same components or the corresponding components are given the same reference numerals to omit descriptions.

The fixed wing aircraft 70 may include the lift fans 71 in main wings 72. Each of the lift fans 71 has a plurality of blades 74 on a rotary shaft 73 and is usually protected by the annular casing 75. Therefore, reduction in leak flows of air from the clearance between the blades 74 and the casing 75 leads to the improvement of energy efficiency.

Therefore, the lift fans 71 provided on the main wings 72 of the fixed wing aircraft 70 may be supported by the support devices 22D. Specifically, at least one (electrodes 30) of the plurality of first electrodes 30A or the plurality of second electrodes 30B provided in the plurality of discharge units 23 of the support device 22D may be disposed apart from each other on the annular casing 75 surrounding the lift fan 71 provided in each of the main wings 72.

This may intermittently induce flows of air (gas G) near the tips of the blades 74 that are rotating via the same principle as in the first example. By intermittently inducing flows of air, leak flows of air from the clearance between the blades 74 of the lift fans 71 and the casings 75 provided on the main wings 72 of the fixed wing aircraft 70 may be reduced. As a result, the energy efficiency of the lift fans 71 provided on the main wings 72 of the fixed wing aircraft 70 may be improved.

Figure 17:
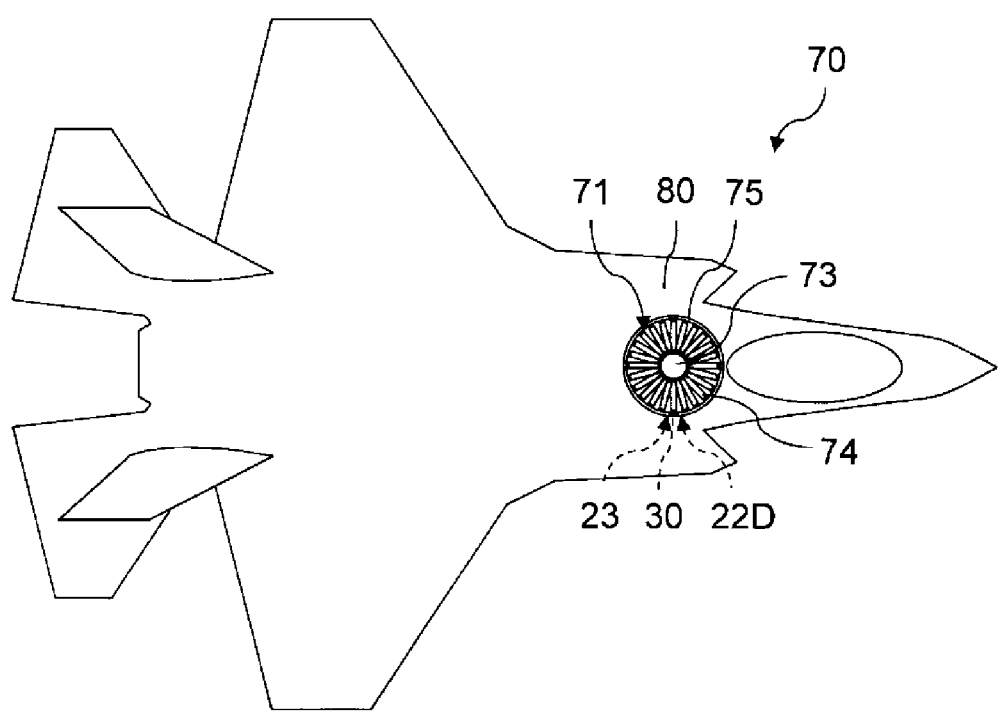
FIG. 17 illustrates another instance of the attachment position of the rotor support device according to the fifth example of the present invention.

FIG. 17 illustrates another instance of the attachment position of the rotor support device according to the fifth example of the present invention.

The fixed wing aircraft 70 may have the lift fan 71 in a fuselage 80 as illustrated in FIG. 17. The lift fan 71 provided in the fuselage 80 also has a plurality of the blades 74 on the rotary shaft 73 normally and is protected by the annular casing 75 normally. Therefore, reduction in leak flows of air from the clearance between the blades 74 and the casing 75 leads to the improvement of energy efficiency.

Therefore, the lift fan 71 provided in the fuselage 80 of the fixed wing aircraft 70 may be supported by the support device 22D. Specifically, at least one (electrodes 30) of the plurality of first electrodes 30A or the plurality of second electrodes 30B provided in the plurality of discharge units 23 of the support device 22D may be disposed apart from each other on the annular casing 75 surrounding the lift fan 71 provided in the fuselage 80.

This may intermittently induce flows of air (gas G) near the tips of the blades 74 that are rotating via the same principle as in the first example. By intermittently inducing flows of air, leak flows of air from the clearance between the blades 74 of the lift fan 71 and the casing 75 provided in the fuselage 80 of the fixed wing aircraft 70 may be reduced. As a result, the energy efficiency of the lift fan 71 provided in the fuselage 80 of the fixed wing aircraft 70 may be improved.

As illustrated in the fifth example, the support device 22D can support not only fans provided in the gas turbine engine 1 for the aircraft 2, but also fans provided in a desired device.

Other Examples

Particular examples have been described above. It should be noted that the described examples are only instances and do not limit the scope of the present invention. The novel methods and devices described here may be practiced in various other forms. In addition, in the forms of the methods and devices described here, various omissions, replacements, and changes may be made without departing from the spirit of the present invention. The appended claims and the equivalents thereof include such various forms and modified examples, which are provided in the scope and the spirit of the present invention.

That is, at least one of the plurality of first electrodes 30A or the plurality of second electrodes 30B provided in the plurality of discharge units 23 may be disposed apart from each other in the static system 40 which is stationary with respect to the rotor provided in the aircraft 2 and which is adjacent to the rotor. This may generate intermittent discharge and flows of the gas G as seen from the coordinate system rotating together with the rotor. As a result, the rotor may be supported effectively.

The invention claimed is:

1. A rotor support device comprising:
a plurality of first electrodes;
a plurality of second electrodes;
one or more dielectric materials disposed between the plurality of first electrodes and the plurality of second electrodes;
one or more AC power supplies configured to apply an alternating-current voltage across the plurality of first electrodes and the plurality of second electrodes and induce flows of gas by causing dielectric barrier discharge between the plurality of first electrodes and the plurality of second electrodes; and
one or more circuits, wherein
at least a pair of electrodes are disposed apart from each other in a static system that is stationary with respect to a rotor provided in an aircraft, the static system being adjacent to the rotor, the pair of electrodes including at least one of the plurality of first electrodes or the plurality of second electrodes,
the one or more circuits stores at least one of a table and a function in which predetermined electrodes out of the at least one of the plurality of first electrodes or the plurality of second electrodes are associated with a number of revolutions of the rotor, and
the one or more circuits are configured to apply the alternating-current voltage to the predetermined electrodes based on the at least one of the table and the function and the number revolutions of the rotor.

2. The rotor support device according to claim 1, wherein the at least one of the plurality of first electrodes or the plurality of second electrodes is disposed apart from each other on an annular casing surrounding the rotor disposed in at least one of an intake fan, a compressor, or a turbine of a gas turbine engine provided in the aircraft.

3. The rotor support device according to claim 1, wherein the at least one of the plurality of first electrodes or the plurality of second electrodes is disposed apart from each other in a stator adjacent to the rotor provided in at least one of a compressor or a turbine of a gas turbine engine provided in the aircraft.

4. The rotor support device according to claim 1, wherein the at least one of the plurality of first electrodes or the plurality of second electrodes is disposed apart from each other on an annular casing surrounding a tail rotor provided in a rotary-wing aircraft.

5. The rotor support device according to claim 1, wherein the at least one of the plurality of first electrodes or the plurality of second electrodes is disposed apart from each other on an annular casing surrounding a fan provided as the rotor in each of main wings or a fuselage of a fixed wing aircraft.

6. The rotor support device according to claim 1, wherein both the plurality of first electrodes and the plurality of second electrodes are disposed apart from each other in the static system.

7. The rotor support device according to claim 1, wherein one of the plurality of first electrodes and the plurality of second electrodes is disposed apart from each other in the static system, and
the other of the plurality of first electrodes and the plurality of second electrodes is attached to a plurality of blades provided in the rotor.

8. The rotor support device according to claim 1, wherein the number of the at least one of the plurality of first electrodes or the plurality of second electrodes disposed apart from each other in the static system is equal to a number associated with the number of revolutions of the rotor.

9. The rotor support device according to claim 1, wherein lengths, in a rotational direction of the rotor, of the at least one of the plurality of first electrodes or the plurality of second electrodes disposed apart from each other in the static system are lengths associated with the number of revolutions of the rotor.

10. The rotor support device according to claim 2, wherein the number of the at least one of the plurality of first electrodes or the plurality of second electrodes disposed apart from each other on the annular casing is equal to the number of intermittent flows of gas for preventing leak flows of gas generated between tips of blades provided in the rotor and the annular casing, the intermittent flows of gas being induced between the tips of the blades provided in the rotor and the annular casing via the dielectric barrier discharge by rotating the blades provided in the rotor about a rotary shaft of the rotor.

11. The rotor support device according to claim 3, wherein the number of the at least one of the plurality of first electrodes or the plurality of second electrodes disposed apart from each other in the stator is equal to the number of intermittent flows of gas for improving energy efficiency when the aircraft flies at stable speed or intermittent flows of gas for stabilizing unstable speed when the aircraft flies at the unstable speed, the intermittent flows of gas being induced between rotor blades and the stator via the dielectric barrier discharge by rotating the rotor blades provided in the rotor about a rotary shaft of the rotor.

12. A rotor comprising:
the support device according to claim 1.

13. A gas turbine engine comprising:
the support device according to claim 2; and
the rotor.

14. An aircraft comprising:
the gas turbine engine according to claim 13.

15. An aircraft comprising:
the rotor according to claim 12.

16. The rotator support device according to claim 1, wherein the rotor includes a blade, and the one or more circuits are configured to apply the alternating-current voltage to the predetermined electrodes to induce flows of gas between the predetermined electrodes and a tip of the blade so that the flows of gas are substantially same as flows of gas between the predetermined electrodes and the tip of the blade in a state where an alternating-current voltage having a burst waveform is applied to the predetermined electrodes.

* * * * *